United States Patent

[11] 3,584,896

| [72] | Inventor | George Jantzen<br>New York, N.Y. |
| --- | --- | --- |
| [21] | Appl. No. | 763,461 |
| [22] | Filed | Aug. 1, 1968<br>Division of Ser. No. 652,343, July 10, 1967, Pat. No. 3,418,007. |
| [45] | Patented | June 15, 1971 |
| [73] | Assignee | M. Steinthal & Company Incorporated<br>New York, N.Y. |

[54] COMBINATION SHOULDER HARNESS AND SEAT BELT BUCKLE SYSTEM
3 Claims, 12 Drawing Figs.

[52] U.S. Cl. ................................................ 280/150, 297/388
[51] Int. Cl. .................................................. B60r 21/10
[50] Field of Search........................................... 280/150 SB; 297/388, 389; 24/200, 230.1

[56] References Cited
UNITED STATES PATENTS

| 3,107,121 | 10/1963 | Mongey................... | 297/388 |
| 3,371,960 | 3/1968 | Bayer et al................ | 280/150 |
| 3,400,977 | 9/1968 | Jones....................... | 297/389 |

Primary Examiner—Kenneth H. Betts
Assistant Examiner—Robert R. Song
Attorney—Milton Robert Kestenbaum ABSTRACT: A combination seat belt buckle in which one of a series of loops towards the end of a retractable shoulder harness strap engages a hook formed on the buckle release fitting. When the release fitting is engaged in the buckle, the hook is closed off, retaining the harness strap. Upon release, the harness strap is automatically retracted behind the roof fabric of the vehicle into a constant tension retractor which extends the end of the strap into the vehicle in the fully retracted condition.

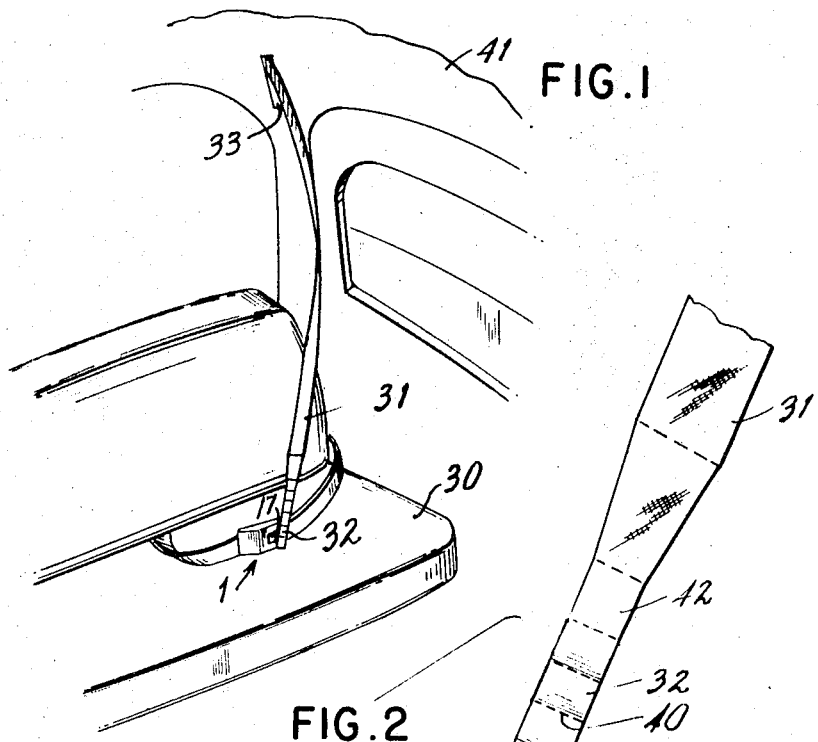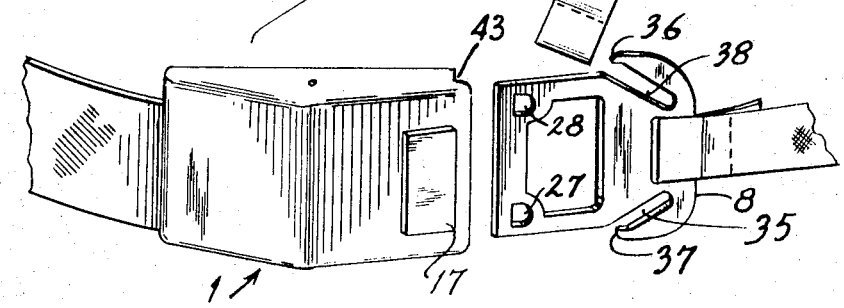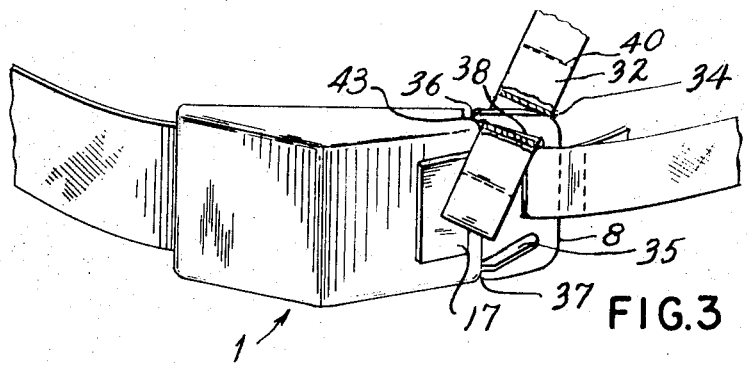

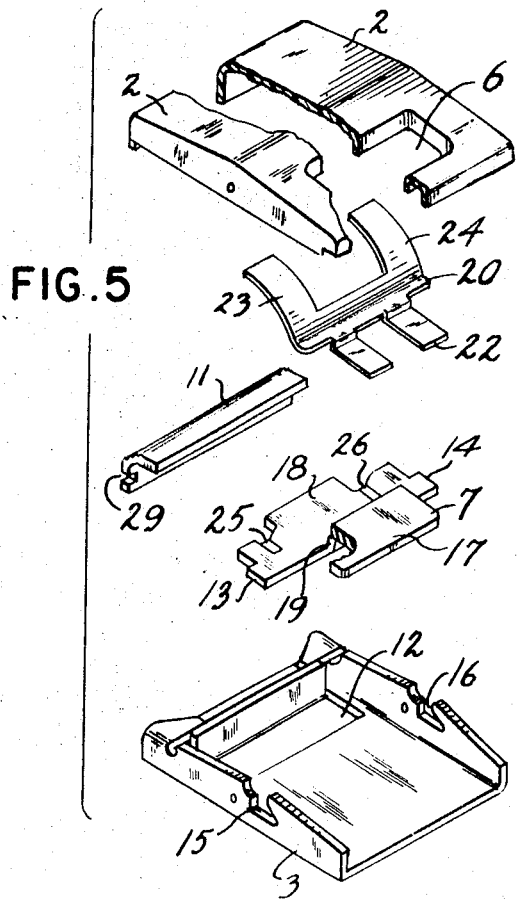
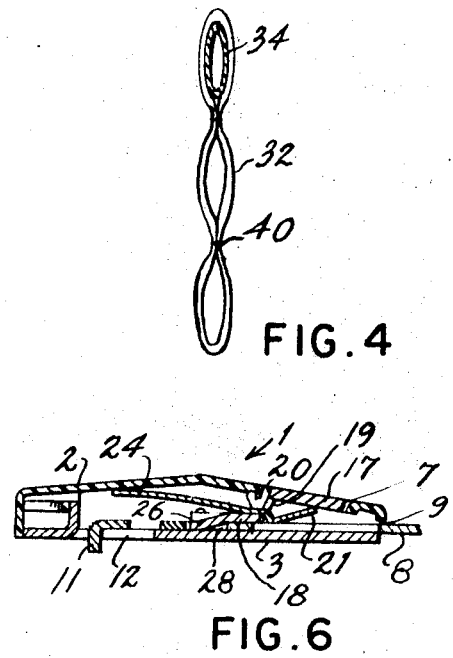
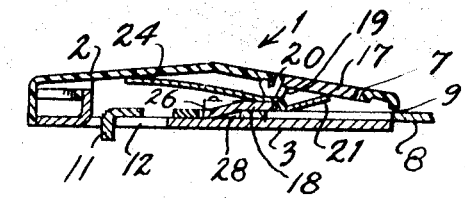
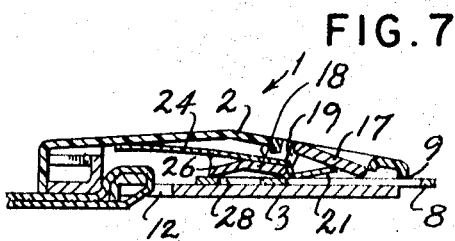
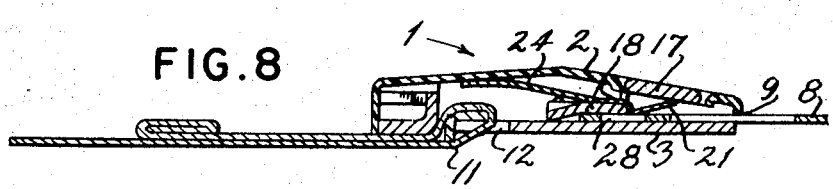

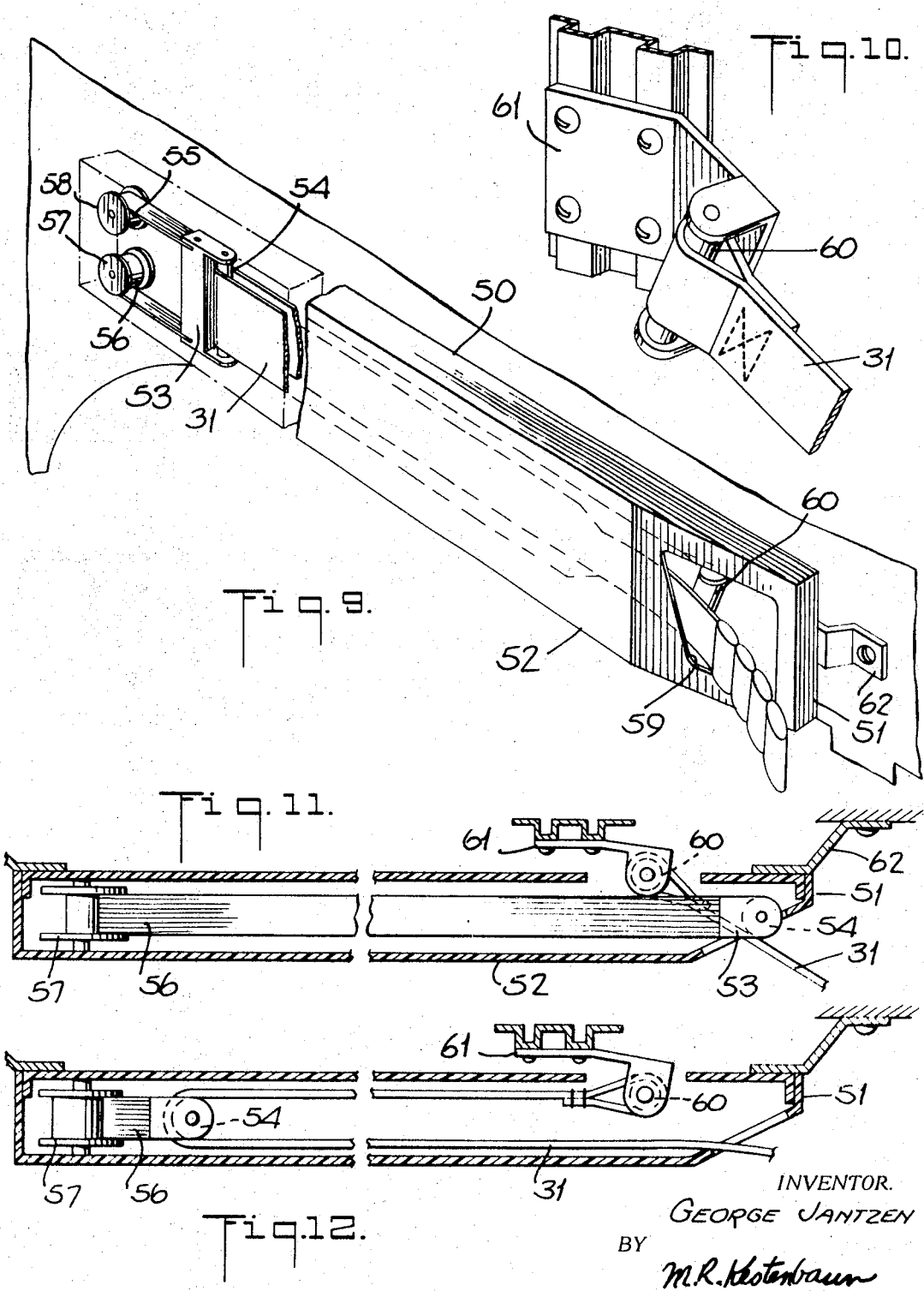

COMBINATION SHOULDER HARNESS AND SEAT BELT BUCKLE SYSTEM

This is a division of application Ser. No. 652,343, filed July 10, 1967. This invention relates to safety belt buckles and more particularly to an arrangement for locking a shoulder harness strap and seat belt straps using buckle, common to both.

A great deal of emphasis has been placed on auto safety and to the use of seat belts. Lap type seat belts which fit across the wearer's pelvic region, have been encouraged and even required. Still, a great deal needs to be done in the field of auto safety. Emphasis is now being placed on the use of an over-the-shoulder harness strap in conjunction with a lap belt. While the lap belt keeps the wearer on the seat in sudden stops, the shoulder harness prevents his upper torso from falling forward into the steering column, windshield or instrument panel.

A paradox results from introducing the additional safety feature of a shoulder harness. It places more straps and buckles in the wearer's path to safety. As a result, it can discourage the wearer from using any. Thus, it is of great advantage to provide a safety belt system which combines a lap belt and a shoulder harness with simplicity of operation—and especially of adjustment—comparable to a lap belt alone. Another important advantage is to provide a system having a retractable shoulder harness as well as a retractable lap belt to overcome the spector of a jungle of straps hanging and lying about with the automobile.

Consequently, it is an object of the present invention to provide a combination buckle for a three point belt system, that is, a single buckle which locks separate shoulder harness and lap straps to a common strap.

Another object of this invention is to provide a combination buckle which is extremely east to operate, in which a quick release mechanism is common to both the shoulder harness strap and the seat belt straps.

Another object of this invention is to provide a combination buckle for a shoulder harness which enables automatic adjustment of the shoulder harness strap to fit any wearer.

An additional object of this invention is to provide a lap belt and shoulder harness system, in which the shoulder harness and the lap are retractable and a combination buckle engages both the lap belt and the shoulder harness.

A further object of this invention is to provide a combination buckle in which the harness strap is capable of automatic and safe retraction.

These objects are achieved in the present invention which employs a buckle and mating release fitting for locking a pair of lap straps together. The release fitting has a slotted portion to which a harness strap can be attached at the free end thereof at any one of a series of adjustment loops. The slotted portion of the release fitting is closed off by the insertion of the release fitting within the buckle, which retains the harness strap locked to the buckle. Operation of a quick release mechanism unlocks both the lap belt and the shoulder harness.

Upon release, the shoulder harness strap is free and is automatically retracted by a retracting mechanism within the roof of the vehicle.

The objects and features just described as well as other objects and features of this invention will be amply clear from the following description taken together with the drawings in which:

FIG. 1 is an isometric view of an automobile interior showing the combination buckle engaging the seat belt and the shoulder harness.

FIG. 2 is an isometric view of the combination buckle in a disengaged condition.

FIG. 3 is an isometric view of the combination buckle in an engaged condition with part of the harness strap broken away.

FIG. 4 is a partially sectional end view of the engaging portion of the shoulder harness.

FIG. 5 is an exploded view of the buckle portion of the combination buckle.

FIG. 6, 7 and 8 are side sectional views of the combination buckle with the release fitting in various stages of engagement.

FIG. 9 is an isometric view of the retractor for the shoulder harness.

FIG. 10 is an isometric view of the anchor fitting for securing the shoulder harness.

FIG. 11 and 12 are schematic view of the shoulder harness in the extended and retracted positions.

Referring to FIG. 1, a combination lap belt and shoulder harness buckle 1 is on the front seat 30 of an automobile in an engaged condition. The shoulder harness strap 31 extends from out of a slot 33 in the roof portion of the automobile, somewhat behind the front seat 30. The slot 33 is angled to the contour of the roof. A retractor mechanism is positioned behind the interior fabric 41 of the automobile and is secured to the structural members which support the roof. When the strap 31 is released from engagement with the buckle 1, it is automatically retracted behind the fabric 41 through the slot 33 by the retractor mechanism. In the fully retracted position the retractor mechanism and the strap 31 are arranged so that a portion of the free end 42 of the strap 31 extends out of the slot 33. The user grasps this free end 42 and pulls it over his shoulder for engaging it with the buckle 1 at any one of a series of loops 32, as will be hereinafter described.

In FIG. 2, the buckle 1, the release fitting 8 and the harness strap 31 are shown in a disengaged condition. The buckle 1 and the release fitting 8 each are attached to one of a pair of straps which form the lap belt. The lap straps are anchored to the floor of the vehicle behind the seat and advantageously are retractable. The buckle 1 is of the pushbutton type and is operated by pressing upon pushbutton 17. The release fitting 8 is inserted into the buckle 1 and locked at its apertures 27, 28 in a manner to be described. Slots 35, 38 angularly disposed to the longitudinal axis of the release fitting 8 extend into the release fitting 8 so as to from a pair of oppositely disposed flat hook portions 36, 37 on the release fitting which open towards the buckle 1. These hook portions 36, 37 have tips which extend generally parallel to the longitudinal axis of the release fitting 8 so as to narrow the slots 35, 38 to an extent.

The harness strap 31 tapers down at its free end 42 to a width which will fit within the wide portion of the slots 35, 38. As shown in FIG. 2 in conjunction with FIG. 4, free end 42 is comprised of two plies of similar flexible fabric which can be formed from a single length of material, folded over at the tip of the free end 42 and overlaid upon itself. Fastening means, such as rows of stitching 40 join the two fabric plies together at regular intervals so as to from a series of material loops 32 up the narrow length of free end 42. A protective insert 34 of plastic or similar material is fitted in each loop 32 and bonded in place.

As an alternative means of protecting the internal portions of the loops against wear, a strip of flexible and stitchable plastic material is bonded along the inner faces of the folded plies and stitched through by the rows of stitching 40 when the loops are formed.

Use and engagement of the combination buckle will now be described with reference to FIG. 3. When the wearer prepares to use the combination buckle, he first adjusts the length of the lap belt to his size, mindful that if the lap belt is retractable, it should be fully extended when adjusting it to fit. The harness strap 31 requires no such adjustment. The wearer merely reaches overhead to grasp the free end 42 of strap 31 as it extends into the automobile interior from roof slot 33. Settling in the left front seat, as shown in FIG. 1, the wearer grasps the free end 42 with his right-hand and pulls it down over his left shoulder and across his upper torso to its fully extended position. Then, while holding the release fitting 8 against his pelvic region, the wearer merely selects one of the series of loops 32 which is appropriate for his height and build and slips it fully over the hooked portion 36 until the tip thereof extends out of the loop 32. In this position the free end 42 of the harness strap 31 is arranged to lie across the face of the release fitting 8.

The wearer than inserts the release fitting 8 into the receiving slot in the buckle 1 and locks it in place. In the locked position, the tip of the hooked portion 36 of the release fitting 8 lies just beneath cutout 43 in the buckle cover and close to the buckle 1. In this position, the slot 38 is closed off and the loop 32 is locked within it.

To release the combination buckle, the wearer presses the pushbutton 17, releasing the release fitting 8 from the buckle 1, whereupon the slot 38 is opened enabling the engaged loop 32 of the harness strap free end 42 to disengage from the release fitting 8.

Upon being released the strap 31 will be automatically retracted by the retracting mechanism up into the automobile roof behind the set. Since the free end 42 of the harness strap 31 is soft and without metal fittings, the wearer will not be harmed should he lose his grasp on the strap 31 while it is retracting.

FIGS. 5, 6, 7 and 8 show the arrangement of working and locking components in the buckle 1. Offcentered towards one end of the top surface of the cover 2 is a rectangular opening 6 in which is fitted the pushbutton portion 17 of a locking component 7. The locking component 7 engages a mating locking member 8 which is inserted into the buckle 1 through a slot 9 at one end thereof. One of the two belt ends which are to be held together by the buckle 1 is threaded through a slot 10 in the locking member 8, folded back and sewn to itself. The other belt end is threaded around a snubber bar 11 which slides within a rectangular slot 12 in the base plate 3.

The pushbutton locking member 7 has opposite tabs 13 and 14 thereon which enable the locking member 7 to pivot in the baseplate 3 when the tabs 13 and 14 are inserted in slots 15 and 16 in the spaced walls of the baseplate 3. The locking component 7 is composed of a pushbutton portion 17, a locking portion 18 and a narrower connecting portion 19. The pushbutton portion 17 is on the opposite side of the pivot axis of the tabs 13 and 14 from the locking portion 18. A spring member 20 has a pair of tabs 21 and 22 which straddle the connecting portion 19 to reset against the underside of pushbutton portion 17 and exert an upward pressure thereon. The spring member 20 rests upon the locking portion 18 and gains the upward spring pressure which it exerts on the pushbutton portion 17 (and the downward spring pressure which it exerts on a pair of detents 24 and 26) through tabs 23 and 24 which press against the underside of cover 2 when the cover 2 is in position over the baseplate 3. As used herein, the directions upward and downward are taken as away from or towards the baseplate 3 respectively.

The locking portion 18 of the locking component 7 has a pair of detents 25 and 26 thereon. These engage with individual ones of a pair of apertures 27 and 28 in the locking member 8 to lock the member 8 to the buckle 1 when the locking member 8 is inserted within the buckle 1.

The snubber bar 11 slides in the rectangular slot 12 in the baseplate 3 along grooves 29 at each end of the snubber bar 11.

The operation of the working and locking components of the buckle 1 will be fully understood in connection with FIGS. 6 through 8. In FIG. 6 the mating locking member 8 is locked within the buckle 1, with the detent 26 of the locking component 7 extending into the aperture 28 in the locking member 8. The upward pressure of the spring member 20 against the underside of the pushbutton portion 17 of the locking component 7 keeps the detent 26 pressed down against the baseplate 3. In this position the buckle 1 and the mating member 8 are engaged and locked.

When one presses against the pushbutton portion 17, actuating it inwardly of the buckle 1, the spring pressure is overcome and the detent 26 is raised out of the aperture 28. In this position, as shown in FIG. 7, the locking member 8 is free to be withdrawn from the buckle 1. FIG. 8, the locking member 8 is seen being reinserted into locking engagement in the buckle 1. The underside of the detent 26 is sloped downward and away from the forward end of the locking member 8. As locking member 8 is pushed against it, the detent 26 will be raised up, overcoming the spring pressure and enabling the locking member 8 to pass into locking engagement.

FIG. 9 shows the shoulder harness strap 31 in a retracted position on the retractor 50. The retractor 50 is comprised of a bottom 51 over which a cover 52 is fitted. A slide 53 is adapted to slide back and forth within the retractor and has a roller 54 at one end. At its other end the slide 53 is attached to the free ends of a pair of self-coiling springs 55, 56 which are retained in position towards one end of the retractor beneath a pair of retaining discs 57, 58. By virtue of the selection of these springs the slide 53 is subject to constant tension throughout the length of its travel. The harness strap 31 enters the retractor 50 through the opening 59 and passes along the length of the retractor, is looped over the roller 54, passes back along the retractor length and is secured, as by stitching, to a roller 60 in anchor fitting 61, shown in FIG. 10. The anchor fitting 61 must carry the shock load in emergency use and hence is secured to a structural member of the vehicle, such as by bolting to a roof beam.

The retractor 50 itself is supported behind the interior fabric of the vehicle above and behind the relevant seat. In the case of the front seat, the retractor is secured to structural members generally above the rear window by clamping members, one of which is shown at 62. The strap 31 passes through the opening 59 and a slot 33 in the interior fabric to the vehicle interior.

FIGS. 11 and 12 shows the shoulder harness strap in the extended and in the retracted position respectively. In the extended position the shoulder harness strap 31 has been pulled as far as it will go out of the retractor. To accommodate, the spring 56 has unwound itself. The strap 31 has rotated at the roller 60 to present an inline loading from the anchor 61 to the wearer. The slide 53 has traveled beyond the loading line so as to be out of the loading linkage and to have no effect on the load bearing of the strap 31.

When the strap free end 42 is disengaged from the release fitting 8, it will automatically be retracted into the retractor 50 due to the bias of spring 56 to return to its wound condition. The length of travel of the slide 53 and the position of the retractor 50 are so arranged that upon full retraction, a portion of the strap 31 at the free end 42 will extend out of the opening 59 and into the vehicle interior so as to be available for grasping by the intended wearer. The strap 31 has rotated at the anchor roller 60 towards the spring 56.

Anchor roller 60 is positioned at an angle of from 25° to 35° from the surface of the supporting structure in the direction of the vehicle interior in order to obtain a direct pull line on strap 31 from the anchor 61 diagonally across the upper torso of the wearer to the release fitting 8 on his right hip (for the passenger in the left seat). This provides the straightest possible strap to obtain equal loading across the strap width.

Slide roller 54 is positioned at a similar angle, which is accomplished by mounting the retractor 50 tilted from its supporting structure at the appropriate angle. The range of 25° to 35° is appropriate for the anchor roller 60 and for retractor 50, and approximately 30° is well suited for the purpose. It has been mentioned earlier that the slot 33 in the interior fabric is angled to the contour of the roof. More particularly, viewed head on, slot 33 is tilted from vertical at an angle of approximately 15°, or within the range of 20° to 35° in the direction away from the relevant seat to which its harness 31 extends.

As viewed head on, if the slot 33 were vertical, the harness strap 31 would edge load and would develop a corkscrew twist upon being retraced and bind. By tipping the slot 31 over 20° to 35°, so to speak, the strap is face loaded against the slot 33 and the opening 59 behind it which tends to iron out the strap 31 as it is retracted. The rear edge of opening 59 on the retractor 50 is set at the same angle as the slot 33 to carry the strap loading as it moves.

It should be understood that although the invention has been described with reference to a specific embodiment, this embodiment is not intended to be limiting in any way. Changes and modifications in this embodiment can be made without departing from the spirit and teachings of this invention.

I claim:

1. A retractor for a shoulder harness strap mounted to structural means generally above and behind the relevant seat, comprising an elongated structure providing a slide path therein and open towards one end thereof, a slide member slideable along said path, a roller journaled to said slide member, spring means secured within said structure towards the other end thereof, said spring means being connected at a free end thereof to said slide to bias said slide towards said spring means, an anchor fitting connected to a vehicle structural member and adapted to permit rotation of said harness strap upon full extraction thereof to allow inline loading of said strap from said anchor fitting to the wearer, said roller being adapted upon full extraction of said strap to travel beyond said loading line, said harness strap being secured to said anchor fitting, thence about said slide roller and thence out of the opening in said structure, said harness strap having a series of loops successively arranged along the free end thereof each of which is adapted to be selectively engaged for securing said strap upon said wearer.

2. A retractor for a shoulder harness strap mounted to structural means generally above and behind the relevant seat, comprising an elongated structure providing a slide path therein and open towards one end thereof, a slide member slideable along said path, a roller journaled to said slide member, spring means secured within said structure towards the other end thereof, said spring means being connected at a free end thereof to said slide to bias said slide towards said spring means, an anchor fitting connected to a vehicle structural member and adapted to permit rotation of said harness strap upon full extraction thereof to allow inline loading of said roller being adapted upon full extraction of said strap to travel beyond said loading line, said harness strap being secured to said anchor fitting, thence about said slide roller and thence out of the opening in said structure, the strap engaging portion of said anchor fitting being tilted at an angle of from 25° to 35° from its connected vehicle structural member towards the interior of said vehicle.

3. A retractor according to claim 2 in which said retractor opening has a rear edge positioned at an angle of from 20° to 35° from vertical in the direction away from the relevant seat.